United States Patent
Lin

(10) Patent No.: US 12,170,665 B2
(45) Date of Patent: Dec. 17, 2024

(54) CLIENT IDENTIFICATION METHOD AND APPARATUS, AND STORAGE MEDIUM AND NETWORK DEVICE

(71) Applicant: TP-LINK CORPORATION LIMITED, Hong Kong (CN)

(72) Inventor: Xiana Lin, Hong Kong (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/412,492

(22) Filed: Jan. 13, 2024

(65) Prior Publication Data

US 2024/0154963 A1 May 9, 2024

(51) Int. Cl.
*H04L 9/40* (2022.01)
*H04L 61/4511* (2022.01)
*H04L 61/5014* (2022.01)

(52) U.S. Cl.
CPC ...... *H04L 63/0876* (2013.01); *H04L 61/4511* (2022.05); *H04L 61/5014* (2022.05)

(58) Field of Classification Search
CPC ............. H04L 63/0876; H04L 61/4511; H04L 61/5014; H04L 2101/622
See application file for complete search history.

(56) References Cited

U.S. PATENT DOCUMENTS

| | | | | |
|---|---|---|---|---|
| 7,376,109 B2 * | 5/2008 | Idehara | ................. | H04W 88/06 455/452.2 |
| 9,215,234 B2 * | 12/2015 | Black | ................. | H04L 63/0876 |
| 9,282,115 B1 * | 3/2016 | Kaushik | ............. | H04L 63/1441 |
| 9,608,995 B2 * | 3/2017 | Kishi | ...................... | H04L 63/08 |
| 10,630,543 B1 * | 4/2020 | Wei | ......................... | H04W 4/70 |
| 10,721,226 B1 * | 7/2020 | Kurani | ............... | H04L 63/0861 |
| 11,005,806 B1 * | 5/2021 | Saldanha | ............ | H04L 63/1408 |
| 2007/0250603 A1 * | 10/2007 | Suen | ...................... | G06F 16/20 707/E17.044 |
| 2010/0088747 A1 * | 4/2010 | Fink | ...................... | H04L 63/102 726/3 |
| 2013/0117358 A1 * | 5/2013 | Ricard | .................. | H04L 67/306 709/203 |

(Continued)

FOREIGN PATENT DOCUMENTS

| | | |
|---|---|---|
| CN | 107071085 A | 8/2017 |
| CN | 112737825 A | 4/2021 |
| CN | 113595812 A | 11/2021 |

*Primary Examiner* — Matthew Smithers
(74) *Attorney, Agent, or Firm* — Loeb & Loeb LLP

(57) ABSTRACT

A client identification method, an apparatus, a storage medium and a network device. The method includes: acquiring, when any client is associated with a network device, a MAC address of the client; searching and matching the MAC address from a user information table, which includes MAC addresses of all clients that have ever been associated with the network device and characteristic information corresponding to each of the MAC addresses; marking the client as successfully identified when the matching of the MAC address is successful; and marking the client as to be detected when the matching of the MAC address is failed, acquiring the characteristic information of the client from a data packet sent by the client, searching and matching the characteristic information of the client from the user information table, and identifying the client according to the matching result.

11 Claims, 2 Drawing Sheets

(56) References Cited

U.S. PATENT DOCUMENTS

| | | | |
|---|---|---|---|
| 2013/0201979 A1* | 8/2013 | Iyer | H04L 12/4679 |
| | | | 370/338 |
| 2014/0068030 A1* | 3/2014 | Chambers | H04L 63/0876 |
| | | | 709/220 |
| 2014/0214670 A1* | 7/2014 | McKenna | G06Q 20/4014 |
| | | | 705/44 |
| 2015/0281245 A1* | 10/2015 | Liu | H04L 63/101 |
| | | | 709/225 |
| 2022/0263824 A1* | 8/2022 | Xue | H04L 63/0876 |

* cited by examiner

CLIENT IDENTIFICATION METHOD AND APPARATUS, AND STORAGE MEDIUM AND NETWORK DEVICE

CROSS-REFERENCE TO RELATED APPLICATION

The present application is a continuation application of U.S. Ser. No. 18/573,873 filed on Dec. 22, 2023, which is a national phase filing of International Application No. PCT/CN2022/101550, filed on Jun. 27, 2022, which claims priority to and benefit of Chinese Patent Application No. 202110716012.4, filed on Jun. 25, 2021. The contents of these applications are incorporated herein by reference in their entirety.

TECHNICAL FIELD

The present disclosure relates to the technical field of communication, and in particular to a method, an apparatus, a computer-readable storage medium and a network device for client identification.

BACKGROUND

A MAC address is an identifier of a network device over a network, and is often used to track the network device. In order to protect user's privacy, systems such as Android, IOS and Windows are all starting to provide a function of generating random MAC addresses, which has caused a serious impact on the related functions of the network devices that carry out rule management by means of MAC addresses, for example, functions such as parental control, QoS priority, IoT and/or the like of a router. Therefore, in order to avoid failure of such functions, the network devices are required to have the capability of client identification.

A current common solution is to realize client identification by user behavior characteristics. This solution is always required to track the user's networking behavior for a long time, such as monitoring domain names and frequencies thereof in DNS request information, URL, User Agent and frequencies thereof in HTTP request information, and/or the like of the user in one day. This is because the user's networking behaviors within a certain period of time have some randomness, and a more reliable behavior analysis may be acquired only after tracking and statistics of a long period.

This solution of identifying by user's behaviors is, however, required parsing and statistics of a large number of communication data packets for a long period of time, and thus cannot achieve a quick identification, and it cannot determine a suitable threshold for the time it specifically takes, which affects the accuracy of identification to a certain extent. Meanwhile, this solution would occupy related resources of a real-time system for a long time, especially in a real-time system device, in which it is required capturing and statistics of user packets for a long time, which may cause consequences such as network delay, congestion and/or the like, leading to degradation in performance of network device.

SUMMARY

The technical problem to be solved by the embodiments of the present disclosure is how to provide a method, an apparatus, a computer-readable storage medium and a network device for client identification that can quickly identify a client without significantly affecting performance of the network device and improve accuracy of identification.

In order to solve the above technical problem, the embodiments of the present disclosure provide a method for client identification, comprising:
  acquiring, when any client is associated with a current network device, a MAC address of the client;
  searching and matching the MAC address of the client from a preset user information table, wherein the user information table includes MAC addresses of all clients that have ever been associated with the current network device and characteristic information corresponding to each of the MAC addresses;
  marking the client as successfully identified when the matching of the MAC address of the client is successful; and
  marking the client as to be detected when the matching of the MAC address of the client is failed, and acquiring, upon receiving a data packet sent by the client, the characteristic information of the client from the data packet; searching and matching the characteristic information of the client from the user information table, and identifying the client according to a result of the matching.

Further, the data packet is a first type of data packet, and the characteristic information of the client is the first type of characteristic information of the client;
  then, searching and matching the characteristic information of the client from the user information table, and identifying the client according to the result of the matching, specifically comprises:
  searching and matching the first type of characteristic information of the client from the user information table;
  determining, when the matching of the first type of characteristic information of the client is successful, whether there is only one piece of the first type of characteristic information in the user information table that is successfully matched with the first type of characteristic information of the client;
  if so, marking the client as successfully identified; and
  if not, acquiring, upon receiving a second type of data packet sent by the client, second type of characteristic information of the client accordingly, searching and matching the second type of characteristic information of the client according to the second type of characteristic information corresponding to the first type of characteristic information in the user information table that is successfully matched with the first type of characteristic information of the client, and identifying the client according to the result of the matching; wherein the user information table includes MAC addresses of all clients that have ever been associated with the current network device, and the first type of characteristic information and the second type of characteristic information corresponding to each of the MAC addresses.

Further, the method further comprises:
  marking, when the matching of the first type of characteristic information of the client is failed, the client as newly added user; and
  adding the MAC address and the first type of characteristic information of the client into the user information table.

Further, marking, when the matching of the first type of characteristic information of the client is failed, the client as newly added user, specifically comprises:

determining, when the matching of the first type of characteristic information of the client is failed, whether a duration of the matching of the first type of characteristic information is less than a preset first matching duration threshold or whether a number of times of the matching is less than a preset first threshold of the number of times of the matching;

if so, re-acquiring, upon receiving a next first type of data packet sent by the client, the first type of characteristic information of the client, and performing a corresponding scheme of processing the matching of the first type of characteristic information, until the duration of the matching is not less than the first matching duration threshold or the number of times of the matching is not less than the first threshold of the number of times of the matching, and marking the client as newly added user; and if not, marking the client as newly added user.

Further, searching and matching the second type of characteristic information of the client according to the second type of characteristic information corresponding to the first type of characteristic information in the user information table that is successfully matched with the first type of characteristic information of the client, and identifying the client according to the result of the matching, specifically comprises:

searching and matching the second type of characteristic information of the client according to the second type of characteristic information corresponding to the first type of characteristic information in the user information table that is successfully matched with the first type of characteristic information of the client;

marking, when the matching of the second type of characteristic information of the client is successful, the client as successfully identified; and marking, when the matching of the second type of characteristic information of the client is failed, the client as newly added user, and adding the MAC address, the first type of characteristic information and the second type of characteristic information of the client into the user information table.

Further, marking, when the matching of the second type of characteristic information of the client is failed, the client as newly added user, specifically comprises:

determining, when the matching of the second type of characteristic information of the client is failed, whether a duration of the matching of the second type of characteristic information is less than a preset second matching duration threshold or whether a number of times of the matching is less than a preset second threshold of the number of times of the matching;

if so, re-acquiring, upon receiving a next second type of data packet sent by the client, the second type of characteristic information of the client, and performing a corresponding scheme of processing the matching of the second type of characteristic information, until the duration of the matching is not less than the second matching duration threshold or the number of times of the matching is not less than the second threshold of the number of times of the matching, and marking the client as newly added user; and if not, marking the client as newly added user.

Further, the first type of data packet is a data packet identifying device information, and the first type of characteristic information corresponds to device information; and the second type of data packet is a data packet identifying user's behavior, and the second type of characteristic information corresponds to user behavior information; or the first type of data packet is a data packet identifying user's behavior, and the first type of characteristic information corresponds to user behavior information; and the second type of data packet is a data packet identifying device information, and the second type of characteristic information corresponds to device information.

Further, the data packet identifying device information includes at least a DHCP data packet, a DHCPv6 data packet and a Probe Request data packet; and the data packet identifying user's behavior includes at least a HTTP data packet and a DNS data packet.

Further, after marking the client as successfully identified when the matching of the MAC address of the client is successful, the method further comprises:

acquiring, upon receiving the data packet sent by the client, the characteristic information of the client from the data packet;

searching and matching the characteristic information of the client from the user information table; and performing, when the matching of the characteristic information of the client is failed, updating processing on the characteristic information corresponding to the MAC address in the user information table that is successfully matched with the MAC address of the client according to the characteristic information of the client.

In order to solve the above technical problem, the embodiments of the present disclosure further provide an apparatus for client identification, comprising:

a MAC address acquiring module for acquiring, when any client is associated with a current network device, a MAC address of the client;

a MAC address matching module for searching and matching the MAC address of the client from a preset user information table, wherein the user information table includes MAC addresses of all clients that have ever been associated with the current network device and characteristic information corresponding to each of the MAC addresses;

a MAC address matching success processing module for marking the client as successfully identified when the matching of the MAC address of the client is successful; and a MAC address matching failure processing module for marking the client as to be detected when the matching of the MAC address of the client is failed, and acquiring, upon receiving a data packet sent by the client, the characteristic information of the client from the data packet, searching and matching the characteristic information of the client from the user information table, and identifying the client according to a result of the matching.

The embodiments of the present disclosure further provide a computer-readable storage medium comprising a stored computer program, wherein the computer program, when executed, controls a device where the computer-readable storage medium is located to perform the method for client identification as described in any of the above.

The embodiments of the present disclosure further provide a network device comprising a processor, a memory and a computer program stored in the memory and configured to be executed by the processor, wherein the processor, when executing the computer program, implements the method for client identification described in any of the above.

Compared with the prior art, the embodiments of the present disclosure provide a method, an apparatus, a computer-readable storage medium and a network device for client identification, comprising: acquiring, when any client is associated with a current network device, a MAC address of the client, and searching and matching the MAC address of the client from a preset user information table, wherein the preset user information table includes MAC addresses of all clients that have ever been associated with the current network device and characteristic information corresponding to each of the MAC addresses; when the matching of the MAC address of the client is successful, it is indicated that the client is successfully identified, then marking the client as successfully identified; when the matching of the MAC address of the client is failed, it is indicated that the client is failed to identify, then marking the client as to be detected, and acquiring, upon receiving a data packet sent by the client, the characteristic information of the client from the data packet, so as to search and match the characteristic information of the client from the preset user information table, and to continue the identification of the client according to a result of the matching. Therefore, identifying the client by the MAC address and related characteristic information of the client does not need to occupy system resources for a long time, so that the client can be identified quickly without significantly affecting performance of the network device, and accuracy of identification can be improved.

DETAILED DESCRIPTION

In the following, the technical solution in the embodiments of the present disclosure will be clearly and completely described with reference to the accompanying drawings. Obviously, the described embodiments are only part of the embodiments, but not all the embodiments, of the present disclosure. Based on the embodiments in the present disclosure, all other embodiments acquired by those ordinary skilled in the art without inventive labor belong to the protection scope of the present disclosure.

Figure 1:
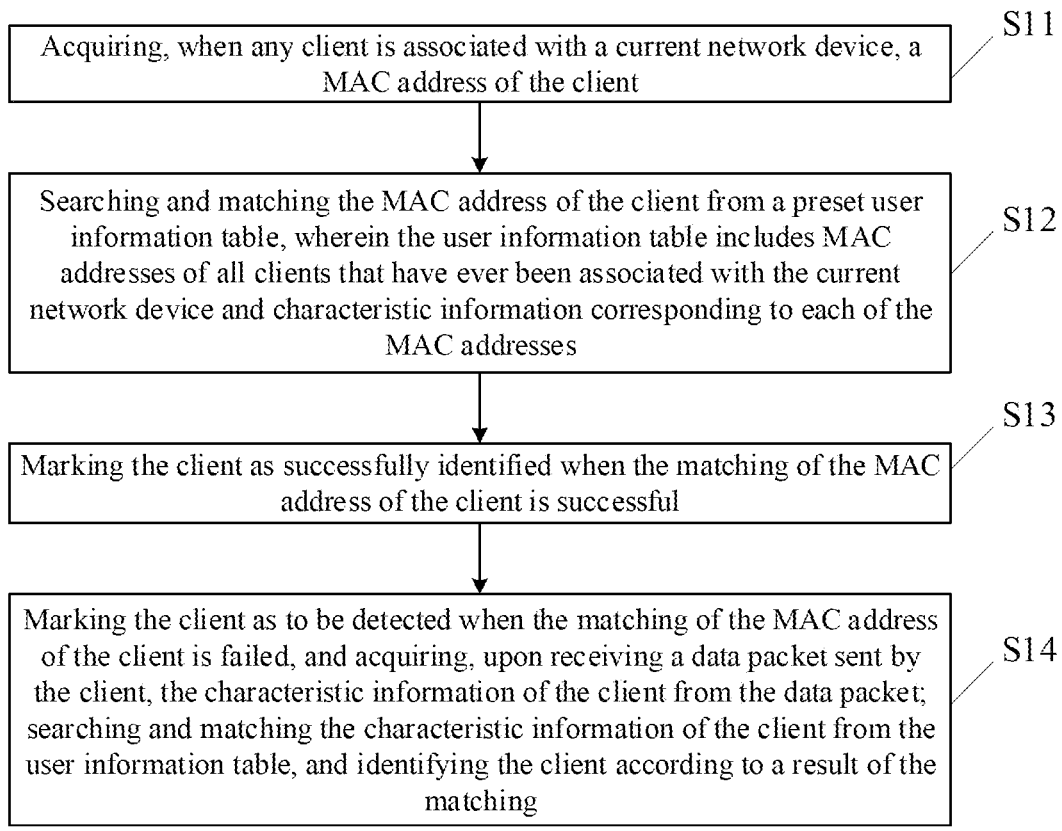
FIG. 1 is a flowchart of a preferred embodiment of a method for client identification provided by the present disclosure.

An embodiment of the present disclosure provides a method for client identification, as shown in FIG. 1. FIG. 1 is a flowchart of a preferred embodiment of the method for client identification provided by the present disclosure. The method comprises steps S11 to S14:

Step S11: acquiring, when any client is associated with a current network device, a MAC address of the client;

Step S12: searching and matching the MAC address of the client from a preset user information table, wherein the user information table includes MAC addresses of all clients that have ever been associated with the current network device and characteristic information corresponding to each of the MAC addresses;

Step S13: marking the client as successfully identified when the matching of the MAC address of the client is successful; and Step S14: marking the client as to be detected when the matching of the MAC address of the client is failed, and acquiring, upon receiving a data packet sent by the client, the characteristic information of the client from the data packet; searching and matching the characteristic information of the client from the user information table, and identifying the client according to a result of the matching.

It should be noted that the embodiments of the present disclosure may be performed by any network device (for example, a router and/or the like) that has been associated with clients and has preset up a user information table. The user information table includes at least MAC addresses corresponding to all clients that have ever been associated with the current network device and characteristic information corresponding to each of the MAC addresses. That is, there is a corresponding relationship among the client, the MAC address, and the characteristic information. When any client is associated with the current network device for the first time, the current network device will add the MAC address and characteristic information corresponding to the client into the user information table, thereby achieving real-time update and maintenance of the user information table.

Specifically, an identification process of a client by the current network device is as follows: when any client is associated with the current network device, the current network device acquires a MAC address of the client, searches and matches the MAC address of the client from a preset user information table, and determines whether there is a MAC address in the user information table that is matched with the MAC address of the client; when the matching of the MAC address of the client is successful, it is indicated that there is a MAC address in the user information table that is matched with the MAC address of the client, and that the client is successfully identified, then marking the client as successfully identified, i.e., adding a mark of "successfully identified" to the client; when the matching of the MAC address of the client is failed, it is indicated that there is no MAC addresses in the user information table that is matched with the MAC address of the client, then marking the client as to be detected, i.e., adding a mark of "to be detected" to the client, meaning that the client has not been successfully identified and it is required to acquire more related characteristic information for further identification. Therefore, the current network device, upon receiving a data packet sent by the client, accordingly parses and acquires the characteristic information of the client from the received data packet, searching and matching the acquired characteristic information of the client from the preset user information table, and determining whether there is characteristic information in the user information table that is matched with the characteristic information of the client, thereby continuing identifying the client according to a result of the matching of the characteristic information of the client.

It should be noted that the marking of the client is to denote the current result of identification of the client. For example, "1" may be used to denote "successfully identified", "0" may be used to denote "to be detected", or it can be marked with any other symbol. The specific marking method adopted is not specifically limited by the embodiments of the present disclosure.

In addition, the characteristic information of the client may be original characteristic information carried by the data packet, or may be characteristic fingerprint information resulted from processing the original characteristic information carried by the data packet. For example, a preset algorithm is employed to process the original characteristic information carried by the data packet, and new numerical or vector values are generated accordingly, which is not specifically limited by the embodiments of the present disclosure.

A method for client identification provided by the embodiments of the present disclosure carries out client identification according to the MAC address and characteristic information of the client in sequence. When the matching of the MAC address of the client is successful, it is indicated that the client identification is successful, it is not required to continue the identification according to the characteristic information of the client. When the matching of the MAC address of the client is failed, it is required to continue the identification further according to the characteristic information of the client. Identifying the client by the MAC address and related characteristic information corresponding to the client does not need to spend a long time in acquiring the behavior characteristics corresponding to the client, that is, does not need to occupy the system resources for a long time, so that the client can be identified quickly without significantly affecting the performance of the network device. Moreover, different clients may have the same or similar behavior characteristics, and since the result of identification acquired in the case of identifying according to behavior characteristics corresponding to the client is greatly influenced by the behavior characteristics, there is a great possibility of misidentification. Nevertheless, since MAC addresses and characteristic information corresponding to different clients are different, there is a low possibility of misidentification for the result of identification acquired in the case of identifying according to MAC addresses and characteristic information of clients, the accuracy of identification can be improved.

In another preferred embodiment, the data packet is a first type of data packet, and the characteristic information of the client is first type of characteristic information of the client; then, searching and matching the characteristic information of the client from the user information table, and identifying the client according to the result of the matching, specifically comprises:

searching and matching the first type of characteristic information of the client from the user information table;

determining, when the matching of the first type of characteristic information of the client is successful, whether there is only one piece of the first type of characteristic information in the user information table that is successfully matched with the first type of characteristic information of the client;

if so, marking the client as successfully identified; and if not, acquiring, upon receiving a second type of data packet sent by the client, second type of characteristic information of the client accordingly, searching and matching the second type of characteristic information of the client according to the second type of characteristic information corresponding to the first type of characteristic information in the user information table that is successfully matched with the first type of characteristic information of the client, and identifying the client according to the result of the matching; wherein the user information table includes MAC addresses of all clients that have ever been associated with the current network device, and the first type of characteristic information and the second type of characteristic information corresponding to each of the MAC addresses.

It should be noted that the data packets sent by the client to the current network device may be divided into different types of data packets according to the information carried, for example, divided into first type of data packets and second type of data packets. Accordingly, the characteristic information of the client acquired by the current network device according to the first type of data packets is first type of characteristic information, and the characteristic information of the client acquired according to the second type of data packets is second type of characteristic information. The user information table includes at least the MAC addresses corresponding to all clients that have ever been associated with the current network device, and the first type of characteristic information and the second type of characteristic information corresponding to each of the MAC addresses. That is, there is a corresponding relationship among the client, the MAC address, the first type of characteristic information and the second type of characteristic information.

Specifically, in combination with the above embodiments, after marking the client as to be detected, the current network device, upon receiving a first type of data packet sent by the client, acquires first type of characteristic information of the client from the received first type of data packet, searches and matches the acquired first type of characteristic information of the client from the above user information table, and determines whether there is first type of characteristic information in the above user information table that is matched with the first type of characteristic information of the client; when the matching of the first type of characteristic information of the client is successful, it is indicated that there is first type of characteristic information in the above user information table that is matched with the first type of characteristic information of the client, since there may be more than one piece of the first type of characteristic information present in the above user information table that is matched with the first type of characteristic information of the client, it is required to further determine whether there is only one piece of first type of characteristic information in the above user information table that is successfully matched with the first type of characteristic information of the client; when there is one and only one piece of first type of characteristic information in the above user information table that is matched with the first type of characteristic information of the client, it is indicated that the client is successfully identified, then the client is marked as successfully identified, i.e., adding a mark of "successfully identified" to the client; when there is more than one piece of the first type of characteristic information in the above user information table that is matched with the first type of characteristic information of the client, a mark of "to be detected" of the client is retained, it is indicated that the client has not been successfully identified and it is required to acquire more related characteristic information for further identification. Therefore, the current network device, upon receiving a second type of data packet sent by the client, accordingly parses and acquires second type of characteristic information of the client from the received second type of data packet, searches and matches the acquired second type of characteristic information of the client according to the second type of characteristic information corresponding to the first type of characteristic information present in the above user information table that is successfully matched with the first type of characteristic information of the client, and determines whether there is second type of characteristic information, among the second type of characteristic information corresponding to the first type of characteristic information present in the user information table that is matched with the first type of characteristic information of the client, that is matched with the second type of characteristic information of the client, so as to continue the identification of the client according to the result of the matching of the second type of characteristic information of the client.

It can be understood that, the above embodiment carries out the client identification according to the MAC address, the first type of characteristic information and the second type of characteristic information of client in sequence, and if the matching of the MAC address of the client is successful, it is not required to continue the identification according to the first type of characteristic information and the second type of characteristic information of the client; if the matching of the MAC address of the client is failed, it is required to continue the identification further according to the first type of characteristic information of the client; and if the matching of the first type of characteristic information of the client is successful, and there is more than one piece of the first type of characteristic information in the user information table that is successfully matched, it is required to continue the identification further according to the second type of characteristic information of the client.

In yet another preferred embodiment, the method further comprises:

marking, when the matching of the first type of characteristic information of the client is failed, the client as newly added user; and adding the MAC address and the first type of characteristic information of the client into the user information table.

Specifically, in combination with the above embodiments, when the matching of the first type of characteristic information of the client is failed, that is, there is no first type of characteristic information in the above user information table that is matched with the first type of characteristic information of the client, it is indicated that the client is a newly added user, then the client is marked as newly added user, i.e., adding a mark of "newly added user" to the client, and adding the MAC address and the first type of characteristic information of the client into the user information table accordingly.

It can be understood that, if the matching of the MAC address of the client is failed, it is required to continue the identification further according to the first type of characteristic information of the client; if the matching of the first type of characteristic information of the client is also failed, it is indicated that there is no first type of characteristic information of the client in the user information table, and that the client has not been associated with the current network device yet, and that the client is a new user with respect to the current network device, then the client is marked as newly added user, and the MAC address and the first type of characteristic information of the client are added into the user information table maintained by the current network device accordingly, thereby achieving real-time update and maintenance of the user information table.

As an improvement of the above solution, marking, when the matching of the first type of characteristic information of the client is failed, the client as newly added user, specifically comprises:

determining, when the matching of the first type of characteristic information of the client is failed, whether a duration of the matching of the first type of characteristic information is less than a preset first matching duration threshold or whether a number of times of the matching is less than a preset first threshold of the number of times of the matching;

if so, re-acquiring, upon receiving a next first type of data packet sent by the client, the first type of characteristic information of the client, and performing a corresponding scheme of processing the matching of the first type of characteristic information, until the duration of the matching is not less than the first matching duration threshold or the number of times of the matching is not less than the first threshold of the number of times of the matching, and marking the client as newly added user; and if not, marking the client as newly added user.

Specifically, in combination with the above embodiments, before the matching of the first type of characteristic information of the client is successful, the matching processing may be repeated for multiple times for the first type of characteristic information of the client, and the current network device presets a first matching duration threshold or a first threshold of the number of times of the matching so as to limit the duration or the number of times of the matching processing process of the first type of characteristic information.

Taking the limitation on the duration as an example, when the matching of the first type of characteristic information of the client is failed, it is firstly determined whether the current total duration of the matching of the first type of characteristic information is less than the preset first matching duration threshold. If so, the first type of characteristic information of the client may be re-acquired when a first type of data packet sent by the client is received next time, and the searching and matching may be carried out again according to the re-acquired first type of characteristic information of the client. When the matching of the first type of characteristic information of the client is failed, it is determined whether the current total duration of the matching of the first type of characteristic information is still less than the preset first matching duration threshold, and corresponding processing is carried out according to the determined result, and so on until the current total duration of the matching of the first type of characteristic information is not less than the preset first matching duration threshold. At this time, if the matching of the first type of characteristic information of the client is still failed, and the current total duration of the matching of the first type of characteristic information is not less than the preset first matching duration threshold, the client will be regarded as a newly added user, and the client will be marked as newly added user.

Similarly, taking the limitation on the number of times as an example, when the matching of the first type of characteristic information of the client is failed, it is firstly determined whether the current total number of times of the matching of the first type of characteristic information is less than the preset first threshold of the number of times of the matching. If so, the first type of characteristic information of the client may be re-acquired when a first type of data packet sent by the client is received next time, and the searching and matching may be carried out again according to the re-acquired first type of characteristic information of the client. When the matching of the first type of characteristic information of the client is failed, it is determined whether the current total number of times of the matching of the first type of characteristic information is still less than the preset first threshold of the number of times of the matching, and corresponding processing is carried out according to the determined result, and so on until the current total number of times of the matching of the first type of characteristic information is not less than the preset first threshold of the number of times of the matching. At this time, if the matching of the first type of characteristic information of the client is still failed, and the current total number of times of the matching of the first type of characteristic information is not less than the preset first threshold of the number of times of the matching, the client will be regarded as a newly added user, and the client will be marked as newly added user.

In another preferred embodiment, searching and matching the second type of characteristic information of the client according to the second type of characteristic information corresponding to the first type of characteristic information in the user information table that is successfully matched with the first type of characteristic information of the client, and identifying the client according to the result of the matching, specifically comprises:

searching and matching the second type of characteristic information of the client according to the second type of characteristic information corresponding to the first type of characteristic information in the user information table that is successfully matched with the first type of characteristic information of the client;

marking, when the matching of the second type of characteristic information of the client is successful, the client as successfully identified; and marking, when the matching of the second type of characteristic information of the client is failed, the client as newly added user, and adding the MAC address, the first type of characteristic information and the second type of characteristic information of the client into the user information table.

Specifically, in combination with the above embodiments, in the case that the matching of the first type of characteristic information of the client is successful, and there is more than one piece of the first type of characteristic information in the above user information table that is successfully matched, it is required to continue the identification according to the second type of characteristic information of the client. Therefore, the current network device, upon receiving a second type of data packet sent by the client, accordingly parses and acquires the second type of characteristic information of the client from the received second type of data packet, searches and matches the acquired second type of characteristic information of the client according to the second type of characteristic information corresponding to the first type of characteristic information present in the above user information table that is successfully matched with the first type of characteristic information of the client, and determines whether there is second type of characteristic information, among the second type of characteristic information corresponding to the first type of characteristic information present in the user information table that is matched with the first type of characteristic information of the client, that is matched with the second type of characteristic information of the client; when the matching of the second type of characteristic information of the client is successful, and there is one and only one piece of second type of characteristic information, among the second type of characteristic information corresponding to the first type of characteristic information present in the user information table that is matched with the first type of characteristic information of the client, that is successfully matched with the second type of characteristic information of the client, it is indicated that the client is successfully identified, then the client is marked as successfully identified, i.e., adding a mark of "successfully identified" to the client; when the matching of the second type of characteristic information of the client is failed, that is, there is no second type of characteristic information, among the second type of characteristic information corresponding to the first type of characteristic information present in the user information table that is matched with the first type of characteristic information of the client, that is matched with the second type of characteristic information of the client, it is indicated that the client is a newly added user, then the client is marked as newly added user, i.e., adding a mark of "newly added user" to the client, and adding the MAC address, the first type of characteristic information and the second type of characteristic information of the client into the user information table.

It can be understood that, if the matching of the second type of characteristic information of the client is successful, it is indicated that the client is successfully identified; if the matching of the second type of characteristic information of the client is also failed, it is indicated that there is no second type of characteristic information of the client in the above user information table, and that the client has not been associated with the current network device yet, and that the client is a new user with respect to the current network device, then the client is marked as newly added user, and the MAC address, the first type of characteristic information and the second type of characteristic information of the client are added into the user information table maintained by the current network device accordingly, thereby achieving real-time update and maintenance of the user information table.

It should be noted that, in the case that the matching of the second type of characteristic information of the client is successful, if there is also more than one piece of the second type of characteristic information, among the second type of characteristic information corresponding to the first type of characteristic information present in the user information table that is matched with the first type of characteristic information of the client, that is matched with the second type of characteristic information of the client, then the identification of the client can be continued in combination with third-type characteristic information corresponding to a third-type data packet sent by the client. Accordingly, the current network device may carry out the client identification according to the MAC address, the first type of characteristic information, the second type of characteristic information and the third-type characteristic information of the client in sequence. During the client identification, the more the types of characteristic information are used, the better the effect of identification is, wherein the specific identification principle of each type of characteristic information is the same as that of the above embodiments, which will not be detailed here.

As an improvement of the above solution, marking, when the matching of the second type of characteristic information of the client is failed, the client as newly added user, specifically comprises:

determining, when the matching of the second type of characteristic information of the client is failed, whether a duration of the matching of the second type of characteristic information is less than a preset second matching duration threshold or whether a number of times of the matching is less than a preset second threshold of the number of times of the matching;

if so, re-acquiring, upon receiving a next second type of data packet sent by the client, the second type of characteristic information of the client, and performing a corresponding scheme of processing the matching of the second type of characteristic information, until the duration of the matching is not less than the second matching duration threshold or the number of times of the matching is not less than the second threshold of the number of times of the matching, and marking the client as newly added user; and if not, marking the client as newly added user.

Specifically, in combination with the above embodiments, before the matching of the second type of characteristic information of the client is successful, the matching processing may be repeated for multiple times for the second type of characteristic information of the client, and the current network device presets a second matching duration threshold or a second threshold of the number of times of the matching so as to limit the duration or the number of times of the matching processing process of the second type of characteristic information.

Taking the limitation on the duration as an example, when the matching of the second type of characteristic information of the client is failed, it is firstly determined whether the current total duration of the matching of the second type of characteristic information is less than the preset second matching duration threshold. If so, the second type of characteristic information of the client may be re-acquired when a second type of data packet sent by the client is received next time, and the searching and matching may be carried out again according to the re-acquired second type of characteristic information of the client. When the matching of the second type of characteristic information of the client is failed, it is determined whether the current total duration of the matching of the second type of characteristic information is still less than the preset second matching duration threshold, and corresponding processing is carried out according to the determined result, and so on until the current total duration of the matching of the second type of characteristic information is not less than the preset second matching duration threshold. At this time, if the matching of the second type of characteristic information of the client is still failed, and the current total duration of the matching of the second type of characteristic information is not less than the preset second matching duration threshold, the client will be regarded as a newly added user, and the client will be marked as newly added user.

Similarly, taking the limitation on the number of times as an example, when the matching of the second type of characteristic information of the client is failed, it is firstly determined whether the current total number of times of the matching of the second type of characteristic information is less than the preset second threshold of the number of times of the matching. If so, the second type of characteristic information of the client may be re-acquired when a second type of data packet sent by the client is received next time, and the searching and matching may be carried out again according to the re-acquired second type of characteristic information of the client. When the matching of the second type of characteristic information of the client is failed, it is determined whether the current total number of times of the matching of the second type of characteristic information is still less than the preset second threshold of the number of times of the matching, and corresponding processing is carried out according to the determined result, and so on until the current total number of times of the matching of the second type of characteristic information is not less than the preset second threshold of the number of times of the matching. At this time, if the matching of the second type of characteristic information of the client is still failed, and the current total number of times of the matching of the second type of characteristic information is not less than the preset second threshold of the number of times of the matching, the client will be regarded as a newly added user, and the client will be marked as newly added user.

In yet another preferred embodiment, the first type of data packet is a data packet identifying device information, and the first type of characteristic information corresponds to device information; and the second type of data packet is a data packet identifying user's behavior, and the second type of characteristic information corresponds to user behavior information; or the first type of data packet is a data packet identifying user's behavior, and the first type of characteristic information corresponds to user behavior information; and the second type of data packet is a data packet identifying device information, and the second type of characteristic information corresponds to device information.

Specifically, in combination with the above embodiments, it can be known from the actual situation of the communication between the current network device and the associated client that, the data packets sent by the client to the current network device include at least a data packet identifying device information and a data packet identifying user's behavior. Therefore, the first type of data packets may be data packets identifying device information, or may be data packets identifying user's behavior, and accordingly, the first type of characteristic information acquired by the current network device from the first type of data packets may be device information corresponding to the client, or may be user behavior information corresponding to the client. Similarly, the second type of data packets may be data packets identifying device information, or may be data packets identifying user's behavior, and correspondingly, the second type of characteristic information acquired by the current network device from the second type of data packets may be device information corresponding to the client, or may be user behavior information corresponding to the client.

As an improvement of the above solution, the data packet identifying device information includes at least a DHCP data packet, a DHCPv6 data packet and a Probe Request data packet; and the data packet identifying user's behavior includes at least a HTTP data packet and a DNS data packet.

Specifically, in combination with the above embodiments, the data packets identifying device information include at least data packets carrying the device information of the client, such as DHCP data packets, DHCPv6 data packets and Probe Request data packets. The device information acquired by the current network device from the data packets identifying device information corresponds to DHCP characteristic information, DHCPv6 characteristic information and Probe Request characteristic information. The data packets identifying user's behavior include at least data packets reflecting the user behavior information of the client, such as HTTP data packets and DNS data packets. The user behavior information acquired by the current network device from the data identifying user's behavior corresponds to HTTP characteristic information and DNS characteristic information.

It should be noted that, the DHCP characteristic information includes information of IP frame length, Vendor Class Identifier, TTL and/or the like, the DHCPv6 characteristic information includes information of Link-layer address, DUID and/or the like, the Probe Request characteristic information includes information of SSID Parameter set, Supported Rates, VHT Capabilities and/or the like, the HTTP characteristic information includes information of User Agent, Cookie, URL, Host and/or the like, and the DNS characteristic information includes information of Queries and/or the like.

In another preferred embodiment, after marking the client as successfully identified when the matching of the MAC address of the client is successful, the method further comprises:

acquiring, upon receiving a data packet sent by the client, characteristic information of the client from the data packet;

searching and matching the characteristic information of the client from the user information table; and performing, when the matching of the characteristic information of the client is failed, updating processing on the characteristic information corresponding to the MAC address in the user information table that is successfully matched with the MAC address of the client according to the characteristic information of the client.

Specifically, in combination with the above embodiments, after the client is identified according to its MAC address, the current network device, upon receiving a data packet (e.g., a first type of data packet or a second type of data packet) sent by the client, acquires the characteristic information (e.g., first type of characteristic information or second type of characteristic information) corresponding to the client from the received data packet, searches and matches the characteristic information of the client from the above user information table, and determines whether there is characteristic information in the user information table that is matched with the characteristic information of the client. When the matching of the characteristic information of the client is failed, it is indicated that there is no characteristic information in the user information table that is matched with the characteristic information of the client. Nevertheless, since the client has been successfully matched by MAC address, there are the MAC address that is successfully matched with the MAC address of the client and the characteristic information corresponding to the successfully matched MAC address in the user information table, indicating that the characteristic information corresponding to the successfully matched MAC address present in the user information table does not match the characteristic information acquired from the received data packet sent by the client. Therefore, it is required to carry out corresponding update processing on the characteristic information corresponding to the successfully matched MAC address present in the user information table, that is, to update and replace the characteristic information corresponding to the successfully matched MAC address in the user information table with the characteristic information acquired from the received data packet sent by the client.

Figure 2:
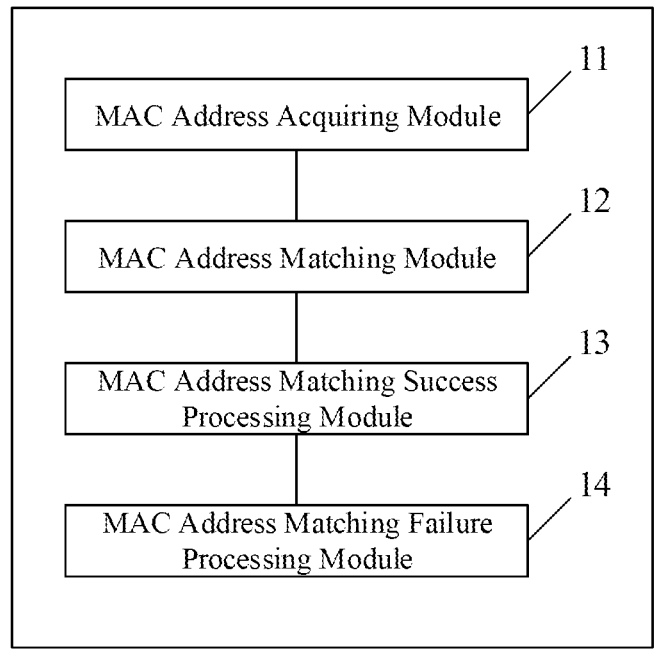
FIG. 2 is a structural block diagram of a preferred embodiment of an apparatus for client identification provided by the present disclosure.

An embodiment of the present disclosure further provides an apparatus for client identification, as shown in FIG. 2. FIG. 2 is a structural block diagram of a preferred embodiment of the apparatus for client identification provided by the present disclosure. The apparatus comprises:

a MAC address acquiring module 11 for acquiring, when any client is associated with current network device, a MAC address of the client;

a MAC address matching module 12 for searching and matching the MAC address of the client from a preset user information table, wherein the user information table includes MAC addresses of all clients that have ever been associated with the current network device and characteristic information corresponding to each of the MAC addresses;

a MAC address matching success processing module 13 for marking the client as successfully identified when the matching of the MAC address of the client is successful; and a MAC address matching failure processing module 14 for marking the client as to be detected when the matching of the MAC address of the client is failed, and acquiring, upon receiving a data packet sent by the client, the characteristic information of the client from the data packet, searching and matching the characteristic information of the client from the user information table, and identifying the client according to a result of the matching.

Preferably, the data packet is a first type of data packet, and the characteristic information of the client is first type of characteristic information of the client;

then, the MAC address matching failure processing module 14 specifically comprises:

a first characteristic matching unit for searching and matching the first type of characteristic information of the client from the user information table;

a first characteristic matching success processing unit for determining, when the matching of the first type of characteristic information of the client is successful, whether there is only one piece of first type of characteristic information in the user information table that is successfully matched with the first type of characteristic information of the client;

a client marking unit for if so, marking the client as successfully identified; and a second characteristic matching unit for if not, acquiring, upon receiving a second type of data packet sent by the client, second type of characteristic information of the client accordingly, searching and matching the second type of characteristic information of the client according to the second type of characteristic information corresponding to the first type of characteristic information in the user information table that is successfully matched with the first type of characteristic information of the client, and identifying the client according to the result of the matching; wherein the user information table includes MAC addresses of all clients that have ever been associated with the current network device, and the first type of characteristic information and the second type of characteristic information corresponding to each of the MAC addresses.

Preferably, the MAC address matching failure processing module 14 further comprises:

a first characteristic matching failure processing unit for marking, when the matching of the first type of characteristic information of the client is failed, the client as newly added user, and adding the MAC address and the first type of characteristic information of the client into the user information table.

Preferably, the first characteristic matching failure processing unit is specifically used for:

determining, when the matching of the first type of characteristic information of the client is failed, whether a duration of the matching of the first type of characteristic information is less than a preset first matching duration threshold or whether a number of times of the matching is less than a preset first threshold of the number of times of the matching;

if so, re-acquiring, upon receiving a next first type of data packet sent by the client, the first type of characteristic information of the client, and performing a corresponding scheme of processing the matching of the first type of characteristic information, until the duration of the matching is not less than the first matching duration threshold or the number of times of the matching is not less than the first threshold of the number of times of the matching, and marking the client as newly added user; and if not, marking the client as newly added user.

Preferably, the second characteristic matching unit specifically comprises:

a second characteristic matching subunit for searching and matching the second type of characteristic information of the client according to the second type of characteristic information corresponding to the first type of characteristic information in the user information table that is successfully matched with the first type of characteristic information of the client;

a second characteristic matching success processing subunit for marking, when the matching of the second type of characteristic information of the client is successful, the client as successfully identified; and a second characteristic matching failure processing subunit for marking, when the matching of the second type of characteristic information of the client is failed, the client as newly added user, and adding the MAC address, the first type of characteristic information and the second type of characteristic information of the client into the user information table.

Preferably, the second characteristic matching failure processing subunit is specifically used for:

determining, when the matching of the second type of characteristic information of the client is failed, whether a duration of the matching of the second type of characteristic information is less than a preset second matching duration threshold or whether a number of times of the matching is less than a preset second threshold of the number of times of the matching;

if so, re-acquiring, upon receiving a next second type of data packet sent by the client, the second type of characteristic information of the client, and performing a corresponding scheme of processing the matching of the second type of characteristic information, until the duration of the matching is not less than the second matching duration threshold or the number of times of the matching is not less than the second threshold of the number of times of the matching, and marking the client as newly added user; and if not, marking the client as newly added user.

Preferably, the first type of data packet is a data packet identifying device information, and the first type of characteristic information corresponds to device information; and the second type of data packet is a data packet identifying user's behavior, and the second type of characteristic information corresponds to user behavior information; or the first type of data packet is a data packet identifying user's behavior, and the first type of characteristic information corresponds to user behavior information; and the second type of data packet is a data packet identifying device information, and the second type of characteristic information corresponds to device information.

Preferably, the data packet identifying device information includes at least a DHCP data packet, a DHCPv6 data packet and a Probe Request data packet; and the data packet identifying user's behavior includes at least a HTTP data packet and a DNS data packet.

Preferably, the apparatus further comprises:

a characteristic information acquiring module for acquiring, upon receiving a data packet sent by the client, characteristic information of the client from the data packet;

a characteristic information matching module for searching and matching the characteristic information of the client from the user information table; and a characteristic information updating module for performing, when the matching of the characteristic information of the client is failed, updating processing on the characteristic information corresponding to the MAC address in the user information table that is successfully matched with the MAC address of the client according to the characteristic information of the client.

The apparatus for client identification provided by the embodiments of the present disclosure can implement all the processes of the method for client identification described in any of the above embodiments, and the functions and realized technical effects of respective modules, units and subunits in the apparatus are correspondingly the same as the functions and realized technical effects of the method for client identification described in the above embodiments, respectively, and will not be detailed here.

The embodiments of the present disclosure further provide a computer-readable storage medium comprising a stored computer program, wherein the computer program, when executed, controls a device where the computer-readable storage medium is located to perform the method for client identification described in any of the above embodiments.

Figure 3:
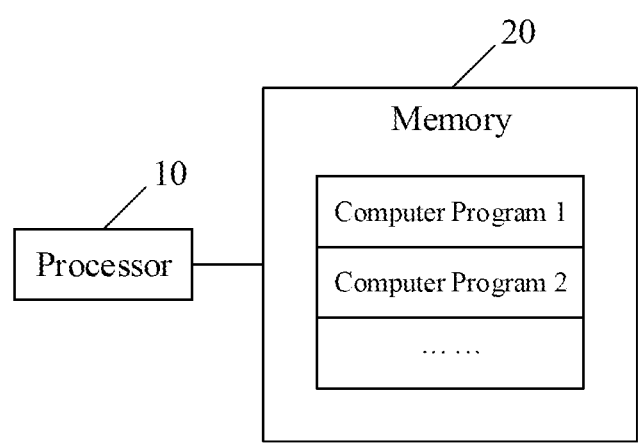
FIG. 3 is a structural block diagram of a preferred embodiment of a network device provided by the present disclosure.

The embodiments of the present disclosure further provide a network device, as shown in FIG. 3. FIG. 3 is a structural block diagram of a preferred embodiment of the network device provided by the present disclosure. The network device includes a processor 10, a memory 20, and a computer program stored in the memory 20 and configured to be executed by the processor 10, wherein the processor 10, when executing the computer program, implements the method for client identification described in any of the above embodiments.

Preferably, the computer program may be divided into one or more modules/units (such as Computer Program 1, Computer Program 2 . . . ), which are stored in the memory 20 and executed by the processor 10 so as to accomplish the present disclosure. The one or more modules/units may be a series of computer program instruction segments capable of accomplishing specific functions, the instruction segments being used to describe the execution process of the computer program in the network device.

The processor 10 may be a Central Processing Unit (CPU), or may be other general processor, a Digital Signal Processor (DSP), an Application Specific Integrated Circuit (ASIC), Field-Programmable Gate Array (FPGA) or other programmable logic device, discrete gate or transistor logic device, discrete hardware component, etc. The general processor may be a microprocessor, or the processor 10 may also be any conventional processor. The processor 10 is the control center of the network device and is connected to respective parts of the network device utilizing various interfaces and lines.

The memory 20 mainly includes a program storage area and a data storage area, wherein the program storage area may store an operating system, an application required by at least one function and/or the like, and the data storage area may store related data and/or the like. In addition, the memory 20 may be a high-speed random access memory, or may be a non-volatile memory, such as a plug-in hard disk, a Smart Media Card (SMC), a Secure Digital (SD) card, a Flash Card, and/or the like, or may be other volatile solid-state storage device.

It should be noted that the above network device may include, but not limited to, a processor, a memory, etc. It can be understood be those skilled in the art that the structural block diagram of FIG. 3 is merely an example of the above network device, does not constitute a limitation to the network device, and may include more or less components than those illustrated, or combine certain components or different components.

To sum up, a method, an apparatus, a computer-readable storage medium and a network device for client identification provided by the embodiments of the present disclosure embody the following beneficial effects:

(1) it is not required to occupy the system resources for a long time, and is capable of identifying the client quickly without significantly affecting the performance of the network device;

(2) it has combined a plurality of types of characteristic information of the client for the client identification, which brings about a better effect of identification than identifying according to single characteristic information; and (3) it has a high accuracy of identification, and can be used to assist the related functions of the network device for rule management by MAC address, for example, the functions of parental control, QoS priority, IoT and/or the like in router products, to come into force normally.

The above are only the preferred embodiments of the present disclosure, and it should be noted that for those skilled in the art, several improvements and variations can be made without departing from the technical principles of the present disclosure, and these improvements and variations should also be regarded as the protection scope of the present disclosure.

What is claimed is:

1. A method for client identification, comprising:
acquiring, when any client is associated with a current network device, a MAC address of the client;
searching and matching the MAC address of the client from a preset user information table, wherein the user information table includes MAC addresses of all clients that have ever been associated with the current network device and characteristic information corresponding to each of the MAC addresses;
marking the client as successfully identified when the matching of the MAC address of the client is successful; and
marking the client as to be detected when the matching of the MAC address of the client is failed, and acquiring, upon receiving a data packet sent by the client, the characteristic information of the client from the data packet; searching and matching the characteristic information of the client from the user information table, and identifying the client according to a result of the matching.

2. The method for client identification according to claim 1, wherein the data packet is a first type of data packet, and the characteristic information of the client is first type of characteristic information of the client;
then, searching and matching the characteristic information of the client from the user information table, and identifying the client according to the result of the matching, specifically comprises:
searching and matching the first type of characteristic information of the client from the user information table;
determining, when the matching of the first type of characteristic information of the client is successful, whether there is only one piece of the first type of characteristic information in the user information table that is successfully matched with the first type of characteristic information of the client;
if so, marking the client as successfully identified; and
if not, acquiring, upon receiving a second type of data packet sent by the client, second type of characteristic information of the client accordingly, searching and matching the second type of characteristic information of the client according to the second type of characteristic information corresponding to the first type of characteristic information in the user information table that is successfully matched with the first type of characteristic information of the client, and identifying the client according to the result of the matching; wherein the user information table includes MAC addresses of all clients that have ever been associated with the current network device, and the first type of characteristic information and the second type of characteristic information corresponding to each of the MAC addresses.

3. The method for client identification according to claim 2, wherein the method further comprises:
marking, when the matching of the first type of characteristic information of the client is failed, the client as newly added user; and
adding the MAC address and the first type of characteristic information of the client into the user information table.

4. The method for client identification according to claim 3, wherein marking, when the matching of the first type of characteristic information of the client is failed, the client as newly added user, specifically comprises:
determining, when the matching of the first type of characteristic information of the client is failed, whether a duration of the matching of the first type of characteristic information is less than a preset first matching duration threshold or whether a number of times of the matching is less than a preset first threshold of the number of times of the matching;
if so, re-acquiring, upon receiving a next first type of data packet sent by the client, the first type of characteristic information of the client, and performing a corresponding scheme of processing the matching of the first type of characteristic information, until the duration of the matching is not less than the first matching duration threshold or the number of times of the matching is not less than the first threshold of the number of times of the matching, and marking the client as newly added user; and
if not, marking the client as newly added user.

5. The method for client identification according to claim 2, wherein searching and matching the second type of characteristic information of the client according to the second type of characteristic information corresponding to the first type of characteristic information in the user information table that is successfully matched with the first type of characteristic information of the client, and identifying the client according to the result of the matching, specifically comprises:
- searching and matching the second type of characteristic information of the client according to the second type of characteristic information corresponding to the first type of characteristic information in the user information table that is successfully matched with the first type of characteristic information of the client;
- marking, when the matching of the second type of characteristic information of the client is successful, the client as successfully identified; and
- marking, when the matching of the second type of characteristic information of the client is failed, the client as newly added user, and adding the MAC address, the first type of characteristic information and the second type of characteristic information of the client into the user information table.

6. The method for client identification according to claim 5, wherein marking, when the matching of the second type of characteristic information of the client is failed, the client as newly added user, specifically comprises:
- determining, when the matching of the second type of characteristic information of the client is failed, whether a duration of the matching of the second type of characteristic information is less than a preset second matching duration threshold or whether a number of times of the matching is less than a preset second threshold of the number of times of the matching;
- if so, re-acquiring, upon receiving a next second type of data packet sent by the client, the second type of characteristic information of the client, and performing a corresponding scheme of processing the matching of the second type of characteristic information, until the duration of the matching is not less than the second matching duration threshold or the number of times of the matching is not less than the second threshold of the number of times of the matching, and marking the client as newly added user; and
- if not, marking the client as newly added user.

7. The method for client identification according to claim 2, wherein the first type of data packet is a data packet identifying device information, and the first type of characteristic information corresponds to device information; and the second type of data packet is a data packet identifying user's behavior, and the second type of characteristic information corresponds to user behavior information; or
- the first type of data packet is a data packet identifying user's behavior, and the first type of characteristic information corresponds to user behavior information; and the second type of data packet is a data packet identifying device information, and the second type of characteristic information corresponds to device information.

8. The method for client identification according to claim 7, wherein the data packet identifying device information includes at least a DHCP data packet, a DHCPv6 data packet and a Probe Request data packet; and the data packet identifying user's behavior includes at least a HTTP data packet and a DNS data packet.

9. The method for client identification according to claim 1, wherein after marking the client as successfully identified when the matching of the MAC address of the client is successful, the method further comprises:
- acquiring, upon receiving the data packet sent by the client, the characteristic information of the client from the data packet;
- searching and matching the characteristic information of the client from the user information table; and
- performing, when the matching of the characteristic information of the client is failed, updating processing on the characteristic information corresponding to the MAC address in the user information table that is successfully matched with the MAC address of the client according to the characteristic information of the client.

10. A non-transitory computer-readable storage medium comprising a stored computer program, wherein the computer program, when executed, controls a device where the non-transitory computer-readable storage medium is located to perform a method for client identification, the method comprising:
- acquiring, when any client is associated with a current network device, a MAC address of the client;
- searching and matching the MAC address of the client from a preset user information table, wherein the user information table includes MAC addresses of all clients that have ever been associated with the current network device and characteristic information corresponding to each of the MAC addresses;
- marking the client as successfully identified when the matching of the MAC address of the client is successful; and
- marking the client as to be detected when the matching of the MAC address of the client is failed, and acquiring, upon receiving a data packet sent by the client, the characteristic information of the client from the data packet; searching and matching the characteristic information of the client from the user information table, and identifying the client according to a result of the matching.

11. A network device comprising a processor, a memory and a computer program stored in the memory and configured to be executed by the processor, wherein the processor, when executing the computer program, implements a method for client identification the method comprising:
- acquiring, when any client is associated with a current network device, a MAC address of the client;
- searching and matching the MAC address of the client from a preset user information table, wherein the user information table includes MAC addresses of all clients that have ever been associated with the current network device and characteristic information corresponding to each of the MAC addresses;
- marking the client as successfully identified when the matching of the MAC address of the client is successful; and
- marking the client as to be detected when the matching of the MAC address of the client is failed, and acquiring, upon receiving a data packet sent by the client, the characteristic information of the client from the data packet; searching and matching the characteristic information of the client from the user information table, and identifying the client according to a result of the matching.

* * * * *

UNITED STATES PATENT AND TRADEMARK OFFICE
CERTIFICATE OF CORRECTION

PATENT NO. : 12,170,665 B2
APPLICATION NO. : 18/412492
DATED : December 17, 2024
INVENTOR(S) : Xiana Lin Page 1 of 1

It is certified that error appears in the above-identified patent and that said Letters Patent is hereby corrected as shown below:

On the Title Page

Item (63), insert:
--Related U.S. Application Data
(63) Continuation of application No. 18/573,873, filed as application No. PCT/CN2022/101550 on June 27, 2022, now abandoned.--

Item (30), insert:
--(30) Foreign Application Priority Data
June 25, 2021 (CN) .............................. 202110716012.4--

Signed and Sealed this
Eleventh Day of February, 2025

Coke Morgan Stewart
*Acting Director of the United States Patent and Trademark Office*